2,390,482

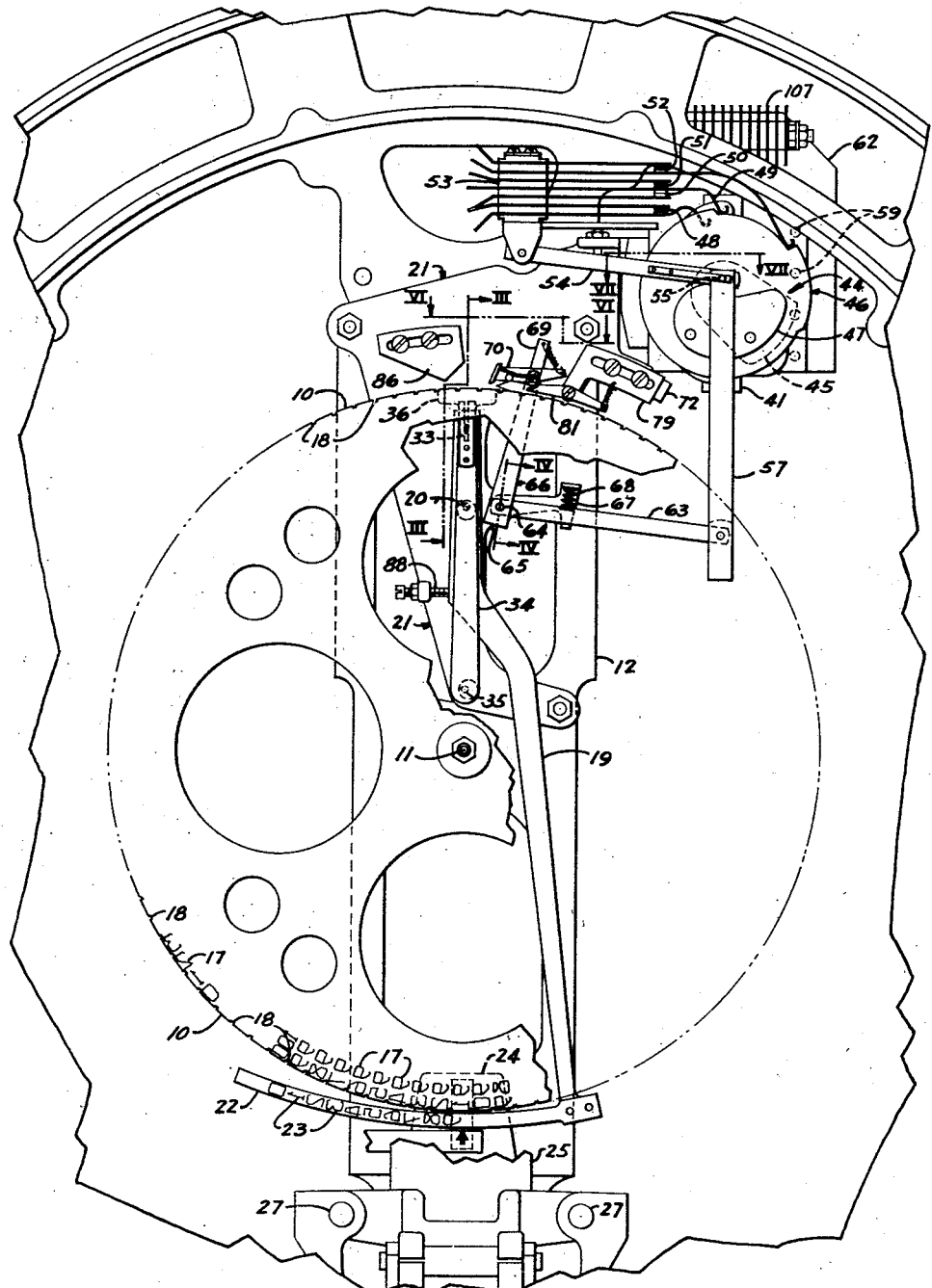
Fig. I

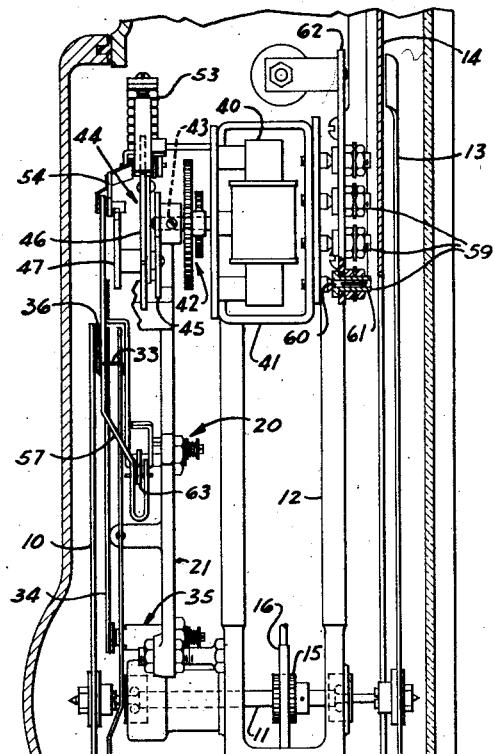
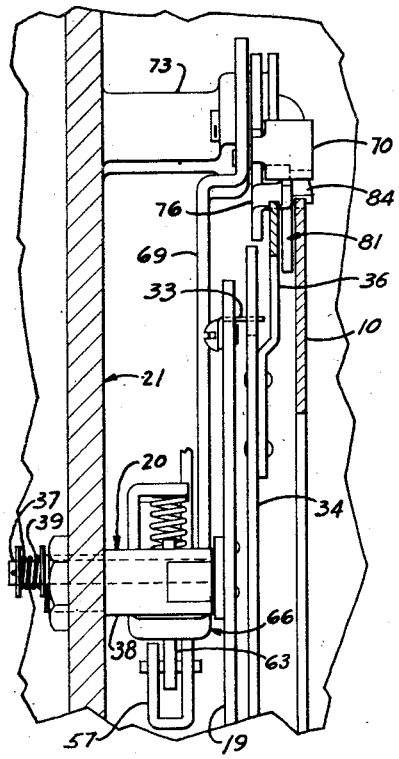
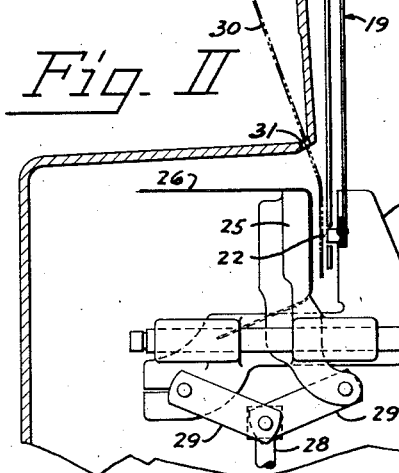
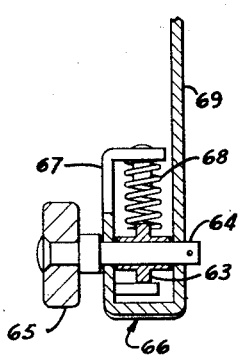
Dec. 4, 1945.   L. S. WILLIAMS   2,390,482
PRINTING SCALE
Filed July 28, 1941   5 Sheets-Sheet 2
Fig. III
Fig. II
Fig. IV
Lawrence S. Williams
INVENTOR
BY Marshall & Marshall
ATTORNEYS Dec. 4, 1945. L. S. WILLIAMS 2,390,482
PRINTING SCALE
Filed July 28, 1941 5 Sheets-Sheet 3
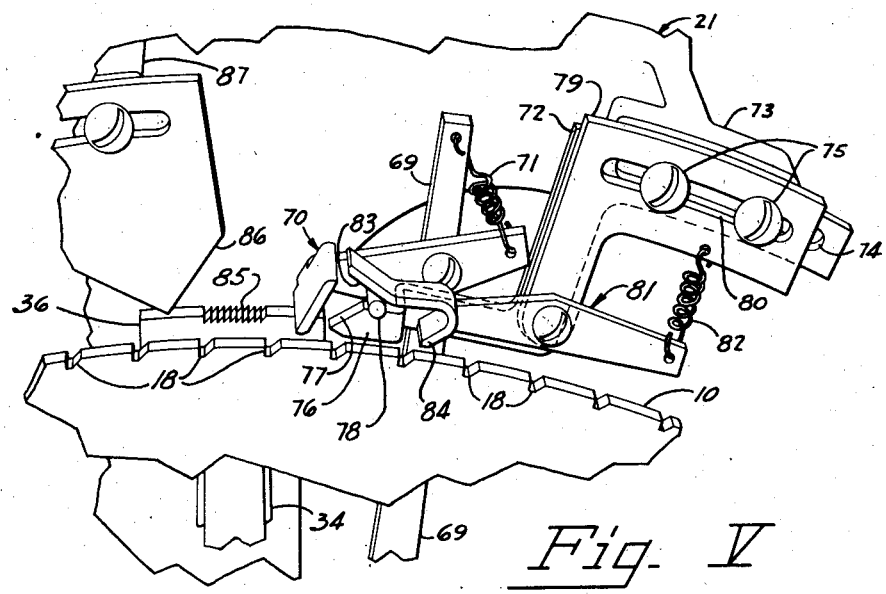
Fig. V
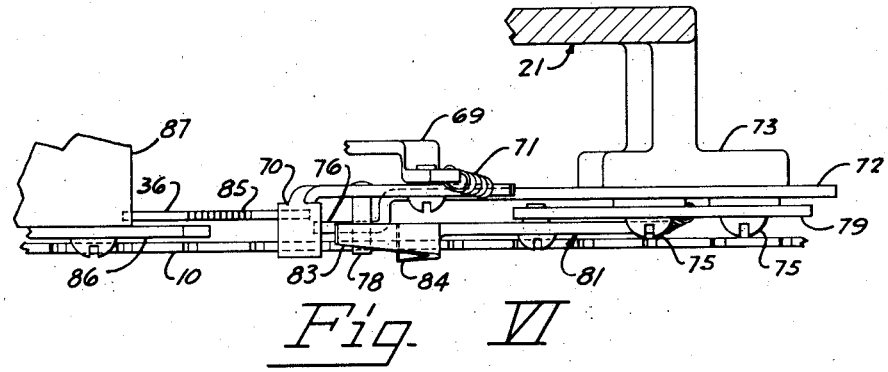
Fig. VI
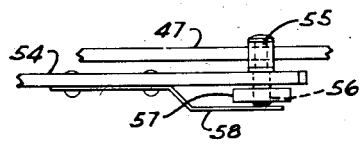
Fig. VII
Lawrence S. Williams
INVENTOR
BY Marshall & Marshall
ATTORNEYS Dec. 4, 1945.   L. S. WILLIAMS   2,390,482
PRINTING SCALE
Filed July 28, 1941   5 Sheets-Sheet 4
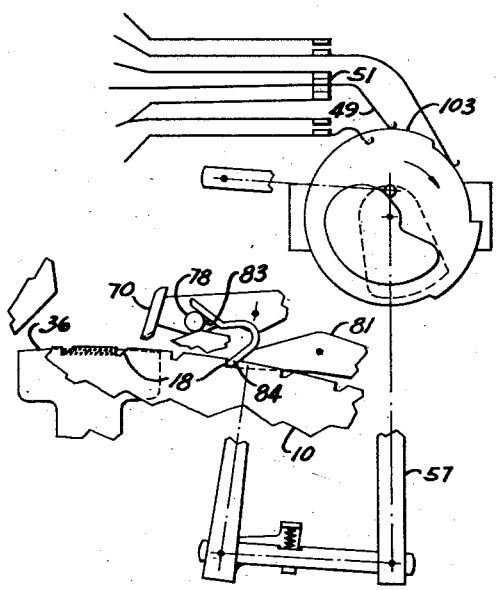
Fig. IX
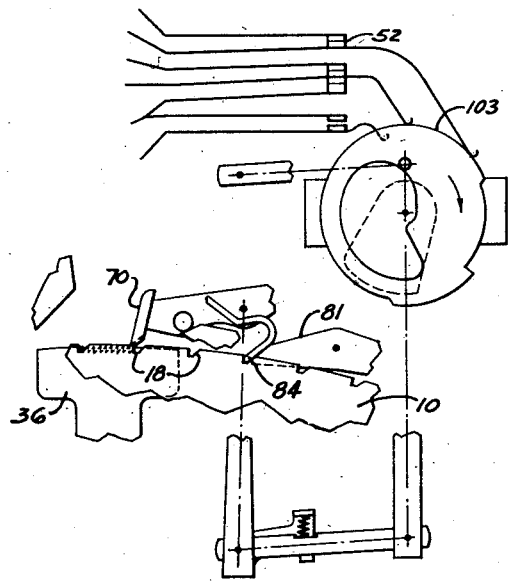
Fig. X
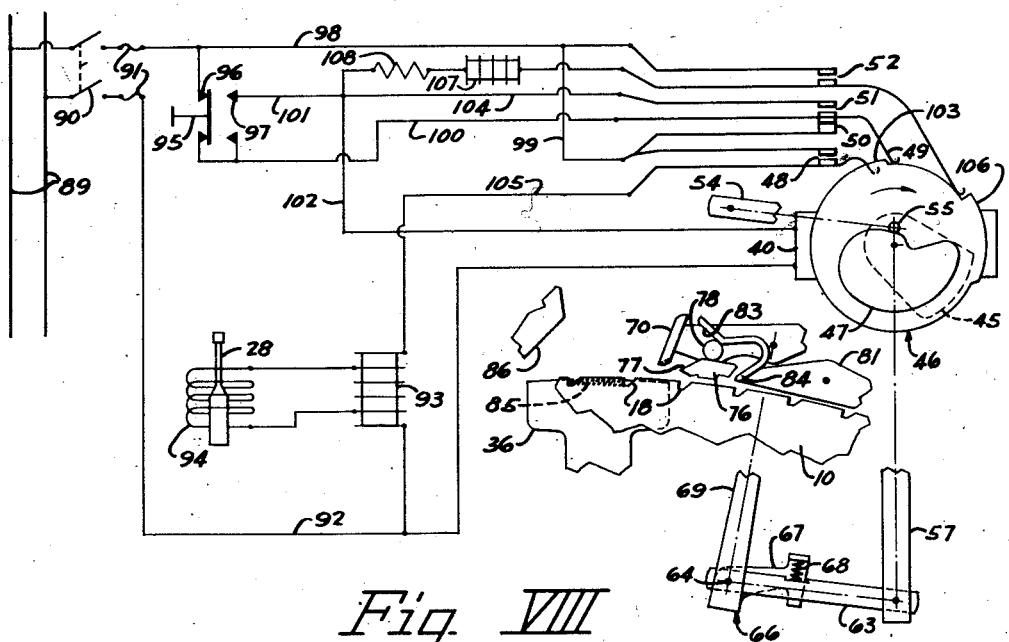
Fig. VIII
Lawrence S. Williams
INVENTOR
BY Marshall & Marshall
ATTORNEYS Dec. 4, 1945.  L. S. WILLIAMS  2,390,482
PRINTING SCALE
Filed July 28, 1941  5 Sheets-Sheet 5
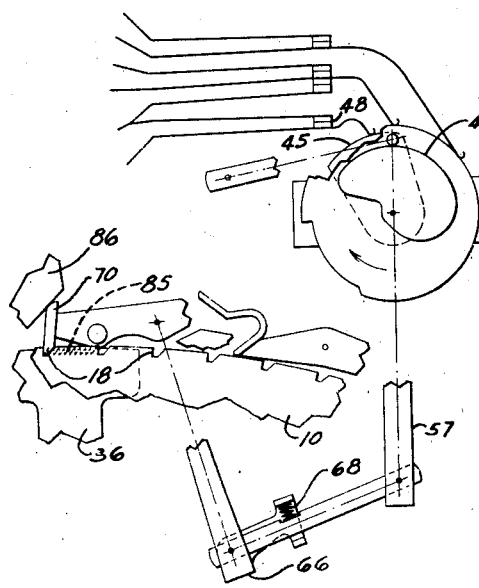
Fig. XI
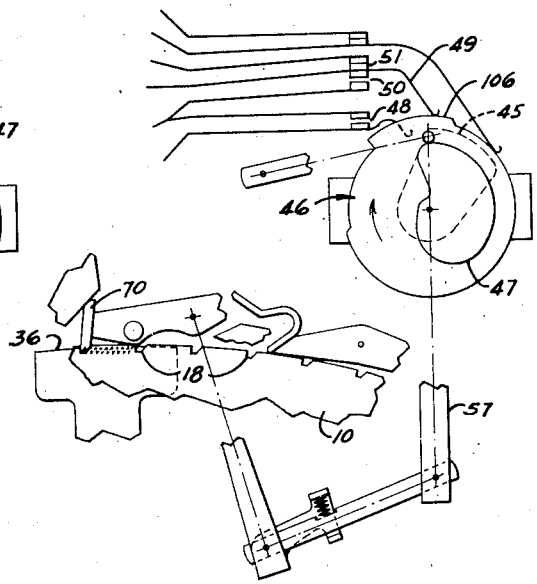
Fig. XII
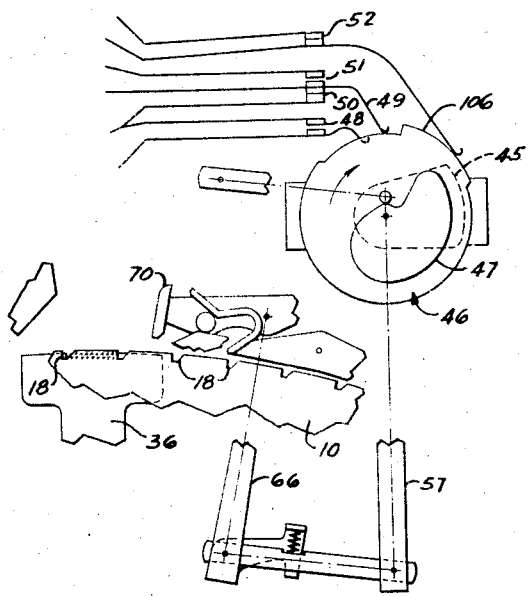
Fig. XIII
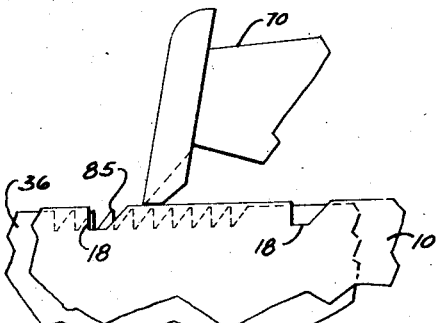
Fig. XIV
Lawrence S. Williams
INVENTOR
BY Marshall & Marshall
ATTORNEYS Patented Dec. 4, 1945

UNITED STATES PATENT OFFICE 2,390,482

PRINTING SCALE

Lawrence S. Williams, Toledo, Ohio, assignor to Toledo Scale Company, Toledo, Ohio, a corporation of New Jersey Application July 28, 1941, Serial No. 404,308

2 Claims. (Cl. 234—5.4)

This invention relates to weighing scales of the type which automatically position large sized characters for the printing of weights, and which automatically print such weights in large clear figures, and more particularly to mechanism for controlling the positioning of such characters and the timing of the sequence of positioning and printing operations.

In the construction of printing scales there are several difficulties which must be overcome in order to construct a scale of high accuracy, great durability and rapid operation. Various types of mechanisms have been devised to set up type characters corresponding to the weights indicated on the scale. Some of these mechanisms have employed a multiplicity of parts, including heavy and bulky members, which have, through necessity, often been moved by auxiliary mechanisms. These auxiliary mechanisms have been necessary due to the fact that it is impossible to move anything but the very lightest members by means of the scale mechanism itself. Any heavy parts attached to such mechanism, because of their inertia and mass, destroy the accuracy of the scale, shorten its serviceable life, and, if these two objections are overcome through the use of auxiliary driving mechanisms, the time necessary to actuate such mechanisms must be added to the weighing time, usually resulting in a printing cycle of lengthy duration and thus cutting down on the number of weighing operations which can be carried out on the scale, and consequently on the scale's utility. Other devices driven by the scale itself have been employed to position, or to carry into position, the type members for printing the weights. Since these type-carrying members must be kept extremely light, and yet strong enough to overcome the shock of a printing impact, their size is necessarily limited. Since the size must be limited, it has been difficult to construct such printing members having a sufficient number of characters to completely cover the ranges of weights which industry has found desirable.

It is an object of this invention to provide a printing scale capable of printing records in large characters in a short printing cycle.

Another object of this invention is to provide a printing scale in which a portion of the type bearing mechanism is moved into position by the scale itself and another portion moved into position by an auxiliary mechanism.

A further object of this invention is to provide a printing scale having a positive auxiliary mechanism for positioning the scale-set type bearing means and for positioning an auxiliary type bearing means.

It is still another object of this invention to provide an auxiliary mechanism for timing the movements of the various elements of the mechanism and for controlling the sequence of the type setting and printing operations.

And still another object of this invention is to provide a type-carrying member actuated by the scale mechanism, such member carrying type representing the major divisions of weight and an auxiliary mechanism for positioning such member for printing, for positioning an auxiliary indicia bearing member having characters corresponding to the minor divisions of weight and for the timing and controlling of these positioning operations and of the printing operation.

In my copending application Serial No. 211,221 there is disclosed a printing scale of which the present invention is a modification and improvement.

More specific objects and advantages are apparent from the description, in which reference is had to the accompanying drawings illustrating a preferred form of scale embodying the invention.

In the drawings:

Fig. I is a view in elevation of a printing mechanism embodying the invention, certain parts being broken away.

Fig. II is a view in side elevation of the printing mechanism illustrated in Fig. I.

Fig. III is a fragmentary detailed view, on a larger scale, taken on the line III—III of Fig. I.

Fig. IV is a fragmentary detailed sectional view, taken on the line IV—IV of Fig. I.

Fig. V is a fragmentary detailed view in perspective of the positioning pawl and associated mechanism.

Fig. VI is a fragmentary plan view of the mechanism shown in Fig. V, taken on the line VI—VI of Fig. I.

Fig. VII is a detailed plan view of a connecting link taken on the line VII—VII of Fig. I, and shown on a larger scale.

Fig. VIII is a schematic view of the selecting mechanism shown at a position of rest and illustrating a typical wiring diagram for the operation of the mechanism embodying the invention.

Figs. IX, X, XI, XII and XIII are schematic views of the controlling and selecting mechanisms shown in successive stages in a cycle of operation of the printing mechanism shown in Fig. I.

Fig. XIV is a fragmentary detailed view, on a greatly enlarged scale, of the selecting pawl and of the notches in which it is engaged during operation.

These specific drawings and the specific description that follows merely disclose and illustrate the invention and are not intended to impose limitations upon the claims.

A type bearing disk 10 is fixed on one end of an axle 11, which is rotatably mounted in a subframe 12 located within the head of an automatic scale. The axle 11 has affixed to its opposite end an indicator 13 (Fig. II) which is moved over a chart 14 to visually indicate the weight placed upon the scale. Pinned to the axle 11 is a pinion 15, which is rotated by a rack 16 vertically moved by the weight counterbalancing mechanism (not shown).

The disk 10 and indicator 13 are positioned in angular relationship to each other, so that the indicator will point to a value on the dial 14 corresponding to that value on the disk 10 which will at that moment be in a printing position. The disk 10 (Fig. I) carries upon its surface, near its periphery, a series of type characters 17 corresponding to the major divisions of weight; that is tens and hundreds of increments. Corresponding to each of the type characters 17 is a notch 18 cut into the edge of the thin disk.

A vertically depending arm 19 is pivoted in an adjustable eccentric pivot 20 which is mounted in a bracket 21 attached to the subframe 12. Attached to the lower end of the arm 19 is an arcuate strip 22 which is located in the same vertical plane as the type bearing disk 10. The arcuate strip 22 has characters 23 on its surface corresponding to the digits of weight increments.

The lower edge of the disk 10 and the arcuate strip 22 pass between a horizontally movable abutment 24 (Fig. II) and a platen 25 over which passes an ink-carrying ribbon 26. The abutment 24 and the platen 25 are horizontally slidable upon rods 27. The abutment 24 and platen 25 are connected to a vertical actuating rod 28 by means of toggle links 29. In order to effect the printing operation, the rod 28 is moved vertically by a solenoid (not shown) which thus squeezes the abutment 24 and platen 25 together and makes an impression of the type characters 17 and 23 on a card or slip 30, which may be inserted between the ribbon 26 and the disk 10 through a slot 31 in a mechanism cover 32.

The upper end of the arm 19 (Fig III) has mounted therein a projecting finger 33. The finger 33 extends into the opening between the bifurcated ends of a ratchet lever 34. The ratchet lever 34 is pivoted on an adjustable eccentric 35 mounted on the bracket 21 carried by the subframe 12. Attached to the upper end of the lever 34 is a short arcuate ratchet sector 36 which lies behind the disk 10 (Fig. I) and the peripheral surface of which is slightly smaller in radius than that of the disk 10 (Fig. III).

The eccentric 20 (Fig. III) consists of a pin 37 which is mounted in a short eccentrically bored cylinder 38, being held therein by the tension of a spring 39 but free to rotate within the cylinder 38, thus acting as a pivot for the arm 19. The cylinder 38 is rotatably mounted in the bracket 21, and when rotated, changes the pivot point of the arm 19. The eccentric 35 is similarly constructed acting as a pivot for the ratchet lever 34. Adjustment of the eccentric 20 shifts the pivot point of the arcuate strip 22 horizontally, and the type 23 carried thereby, in angular relation to the type 17 on the disk 10. Vertical adjustment of the eccentric 35 varies the pivotal point of the ratchet lever 34 which adjusts the concentricity of its periphery in relation to the periphery of the disk 10.

A motor 40 (Fig. II) is mounted in a bracket 41. The motor 40, through reduction gearing 42, drives a cam shaft 43 journaled in the bracket 41. A compound cam 44 is fixed on the cam shaft 43 and consists of three separate cams 45, 46, 47. The cam 45 (Fig. I) has a short arcuate cam surface which, upon rotation of the cam shaft, raises the lower arm of a contact 48. The cam 46 has a three-level periphery on which ride a movable arm 49 of a double contact 50, 51 and the lower arm of a contact 52. The contacts 48, 50, 51 and 52 are mounted in an insulating bracket 53, carried by the motor bracket 41.

A horizontally disposed arm 54 is pivotally mounted in a lower portion of the insulating bracket 53. The free end of the arm 54 (Figs. I and VII) has a projecting roller 55 mounted therein which rides on the surface of the cam 47. The roller 55 is mounted on a pin 56 which extends through the arm 54 and on which is pivoted a vertically disposed connecting link 57. A spring member 58 is attached to the end of the arm 54 and retains the link 57 on the pin 56.

The motor bracket 41 (Fig. II) is mounted on the subframe 12 by means of jack-connections 59 which serve both to support the bracket 41, the motor 40 and its associated gears, cams and and contacts, and to electrically connect the motor 40 into the wiring system of the mechanism. The jacks 59 consist of bifurcated pins 60 which are friction-held within sockets 61 mounted in a plate 62 attached to the subframe 12. Thus, by removing the link 57 from the pin 56, the motor bracket unit, including the horizontally disposed arm 54, can be detached as a whole from the mechanism and removed from the scale housing in one assembly.

The vertically disposed link 57 (Figs. I and III) is pivotally connected at its lower end to a substantially horizontally disposed actuating link 63 which is pivotally mounted on a pin 64 fastened to an ear 65 of the bracket 21. A bell crank 66 is also pivoted upon the pin 64. The bell crank 66 has a horizontally disposed arm 67, the end of which is turned over horizontally to form a resisting surface for the action of a spring 68, which is upwardly urged by the counterclockwise rotation of the actuating link 63. The spring 68 provides a resilient connection between the cam driven linkage 57, 63 and the bell crank 66.

A vertical arm 69 of the bell crank 66 projects above the periphery of the disk 10 and has pivoted, near its uppermost end, a pawl 70. A spring 71 (Fig. V) is attached to the upper end of the arm 69 and the right-hand end of the pawl 70, and tends to force the latching edge of the pawl 70 downward towards the periphery of the disk 10.

A guiding member 72 is adjustably mounted on a projection 73 from the bracket 21. The projection 73 has a vertical face, in a plane parallel to that of the disk 10, against which the guiding member 72 is fastened. The guiding member 72 has an arcuate slot 74, through which mounting screws 75 pass, which is concentric with the disk 10, permitting angular adjustment of the member 72 with relation to the disk 10. The guiding member 72 has a lower horizontal arm 76 which extends over the disk 10 and which has an incline 77 on its upper edge descending in angular relation to the periphery of the disk 10. A pin 78 projects horizontally from the side of the body of the pawl 10 and rides on the arm 76 of the guiding member 72 which holds the pawl 70 away from the edge of the disk 10 against the action of the spring 71.

An adjustable bracket 79 is also mounted, by means of the screws 75, on the projection 73 and has an arcuate slot 80, similar to the slot 74 in the member 72. Pivoted on the bracket 79 is a preselecting brake 81. One end of the brake 81 is connected to the bracket 79 by a spring 82 which tends to rock the brake 81 towards the edge of the disk 10. The brake 81 has an upwardly inclined surface 83, which rides on the pin 78 and is thus held away from the edge of the disk 10, and a downwardly extending pawl-like portion 84 which, when forced against the edge of the disk 10, is adapted to act as a brake and dampen the motion of the disk 10. The lower edge of the pawl-like portion 84 of the brake 81 may also serve as a preselector when one of the notches 18 in the periphery of the disk 10 is positioned by the weight on the scale so that it is immediately below the edge of the brake 81.

The latching edge of the pawl 70 (Fig. XIV) has a blunt section which is adapted to engage the notches 18, cut in the periphery of the disk 10, and a chisel-like section which is adapted to engage sharp teeth 85 of the ratchet sector 36.

A limit dog 86 is mounted on a projection 87 of the bracket 21 and has a lower inclined edge which is adapted to halt the movement of the pawl 70 after the pawl 70 has engaged one of the notches 18 in the disk 10, and thus properly position the disk 10 for printing. The limit dog 86 is adjustable on an arcuate slot concentric with the disk 10 to permit adjustment of the printing position.

The operation of the pawl and preselector will now be described: When the cam 47 (Fig. I) is rotated by the motor 40, the link 57 is lifted and the bell crank 66 is swung in a counterclockwise direction. Movement of the vertical arm 69 of the bell crank 66 in such counterclockwise direction (Fig. V) moves the pawl 70 toward the left and the pin 78 slides down the incline 77, permitting the latching edge of the pawl 70 to engage the periphery of the disk 10. If one of the notches 18 is not immediately below the latching edge of the pawl 70, the pawl slides along the periphery of the disk 10 until it engages one of the notches 18. Since the arc of the ratchet sector 36 is of a smaller radius than the disk 10, the latching edge of the pawl 70 does not engage the teeth 85 until it has fallen into a notch 18. At the same time, the pin 78, having been removed from beneath the upwardly inclined surface 83 of the preselecting brake 81, the pawl-like portion 84 has been urged downwardly by the spring 82 and is in frictional contact with the edge of the disk 10 slightly before the edge of the pawl 70 makes contact therewith, serving to dampen its oscillations so that the latching edge of the pawl 70 can more quickly be engaged in the notch 18. The spring 82 on the preselecting brake 81 has a greater tension than the spring 71 of the pawl 70, and thus the sliding of the pawl 70 along the edge of the disk 10 cannot move the disk 10 against the braking effect of the preselecting brake 81. After engagement of the pawl 70 in the notch 18 and one of the teeth 85, it continues to move in a counterclockwise direction, carrying the disk 10 and the ratchet sector 36 with it, until its upper edge strikes the limit dog 86, at which time the figures corresponding to the notches entered are in the proper position to be printed.

At certain positions of the disk 10, the latching edge of the pawl 70 might strike squarely on a corner of one of the notches 18. This, of course, would not only injure the mechanism but would result in appreciable error since having hit the corner of the notch the pawl 70 might either drop back into the notch or might move forward (to the left Fig. V) to the next notch. In order to prevent the pawl 70 from hitting the corner of the notch 18, the pawl-like portion 84 of the preselecting brake 81 swings down and engages the edge of the disk 10 an instant before the pawl 70 comes into engagement with the disk 10 and, if it strikes the inclined wall of the notch 18, moves the disk 10 in a clockwise direction sufficiently to assure the landing of the pawl 70 beyond the corner of the notch 18. The adjustment of the guiding member 72 and the bracket 79 determines the relative distance between the landing points of the pawl 70 and the preselecting brake 81 on the disk 10, and thus determines the distance beyond the edge of the notch 18 at which the pawl 70 will be permitted to land.

The ratchet sector 36, which is attached to the upper end of the ratchet lever 34, has a sufficient number of teeth to represent the digit divisions of weight increment for which there are characters 23 on the arcuate strip 22. These teeth evenly divide the distance between two of the notches 18. The ratchet lever 34 is always in the same position when the scale is at zero, and remains in that position until the sharp portion of the latching edge of the pawl 70 engages one of the teeth 85 and moves the ratchet lever 34 in a counterclockwise direction. Since the arm 19 (Fig. I), as has been described, is pivotally connected to the ratchet lever 34, it is pivoted about the eccentric 20 in a counterclockwise direction and the arcuate strip 22 is swung thereby. The relationship between the position of the ratchet lever 34, the ratchet sector 36 and its teeth 85 with respect to the pawl 70 and associated mechanism, is adjustable by means of a stop screw 88 (Fig. I) mounted in an ear on the bracket 21. Moving the screw 88 adjusts the rest position of these associated parts.

If the weight on the scale is in even tens of increments, one of the notches 18 will be positioned at the landing point of the pawl 70 which is also the correct position for the first of the teeth 85. In this case, the pawl 70 will immediately drop into the notch 18, engage the first of the teeth 85, and, continuing its counterclockwise movement, will position the type on the disk 10 corresponding to the notch 18, into which it has dropped, and will swing the arcuate strip 22 through its complete length because of the fact that the first tooth 85 of the ratchet sector 36 has been engaged and thus the ratchet lever 34 is moved through its maximum angular movement and the "0" character 23 will be printed.

If, however, the weight on the scale is not in even tens of increments, the notch 18 will not be positioned immediately at the landing point of the pawl 70 and the pawl 70 will slide along the periphery of the disk 10 until it reaches another notch 18 before it engages one of the teeth 85 of the ratchet sector 36. Before the pawl 70 engages a tooth 85, it will have passed over the number of teeth less one corresponding to the digit which it is desired to select (for example, if the weight ends in 7, the pawl will have passed over six teeth and will have engaged the seventh, counting from the right in Fig. V). This will then leave a sufficient distance between the position of the pawl at engagement with the seventh tooth 85 and the limit dog 86, to move the ratchet sector 36, the ratchet lever 34 and the arm 19 a sufficient distance to swing the "7" character 23 into printing position.

If the weight on the scale, for example, is not in even units of weight, and amounts to approximately 9½ of such units of weight, the preselector brake 81 is used to properly position the disk 10. If the weight on the scale amounts to slightly less than 9½ units of weight, a notch 18 will be located beneath the portion 84 of the preselecting brake 81, and the contacting edge of the portion 84 will engage the sloping shoulder of the notch 18 and back up the disk 10 in a counter-clockwise direction so that the engaging edge of the pawl 70 will contact the edge of the disk 10 just beyond the edge of the notch 18 corresponding to 10 units of weight (this engagement is illustrated in Figs. IX and X). If, on the other hand, the weight on the scale amounts to slightly more than 9½ units of weight, the preselecting brake 81 and pawl 70 are so positioned that the edge of the portion 84 will contact the disk 10 just in back of the sloping shoulder of the notch 18 and the engaging edge of the pawl 70 will contact the disk 10 on the sloping shoulder of the notch 18, corresponding to 10 units of weight, and move forward slightly to drop into such notch.

Referring now to Fig. VIII, the selecting mechanism is shown in the rest position. The contact 48 is normally open, the contact 50 is normally closed and the contacts 51 and 52 are both normally open.

Power is introduced into the wiring circuit from the power line 89 through a master switch 90 and fuses 91. One side of the power line leads through the lead line 92 to one side of the motor 40 and to a rectifier 93 which furnishes current for a printing solenoid 94 which, when energized, actuates the rod 28 to cause the printing operation. The other side of the line is connected in series and in parallel to the contacts 48, 50, 51 and 52 and to a push button 95 having two contacts 96, which is normally closed, and 97, which is normally open. When the push button 95 is depressed, it closes the contact 97 and current passes through a lead 98, a lead 99, the contact 50, a lead 100, the push button contact 97, a lead 101 and a lead 102 to the cold side of the motor 40 which then starts to rotate. Upon rotation of the motor 40, the cams 45, 46 and 47 begin to turn in a clockwise direction. The movable arm 49 is lifted by a surface 103 of the cam 46 and closes the contact 51 as shown in Fig. IX. The push button 95 may now be released, and current passes through the contact 96 from one side of the line, through the lead 100, the contact 51, a lead 104 and the lead 102 to form a hold-in circuit for the motor. At the same time, the cam 47 has been revolved sufficiently to lift the link 57 and thus start the pawl 70 moving in a counterclockwise direction. The pin 78 is thus removed from beneath the surface 83, of the preselecting brake 81, and the pawl-like portion 84 permitted to engage the edge of the disk 10.

In Fig. IX, the portion 84 is shown engaged in one of the notches 18 to preposition the disk 10 to prevent the engaging edge of the pawl 70 from striking the corner of the second notch 18 to the left.

Fig. X shows the cams still further rotated with the contact 52 closed as a result of the engagement of its lower arm on the cam surface 103. Closing of the contact 52 at this time makes no difference in the operation of the motor but merely conditions the circuit for a subsequent change. The pawl 70 has now come into contact with that portion of the edge of the disk 10 which is beyond the square shoulder of the notch 18, the corner of which it would have hit had not the preselecting brake 81 moved the disk 10 slightly in a clockwise direction by the engagement of the pawl-like portion 84 with the inclined wall of the notch 18 in which it is now seated.

In Fig. XI, the cams have rotated far enough so that the arm 57 has been lifted sufficiently to move the pawl 70 to the left far enough for it to drop in the notch 18 and engage the correct one of the teeth 85 and then move both the disk 10 and the ratchet sector 36 a sufficient distance to the left to line up the correct type characters. The pawl 70 has come into contact with the limit dog 86 and the cam surface 47 has lifted the link 57 a slight distance further than is necessary to make the pawl 70 contact the limit dog 86, thus compressing the spring 68 in the bell crank 66 and assuring that the pawl 70 has moved to the limit of its stroke. At this point, the contact 48 has been closed by the cam 45 and current passes from the lead 98, through the lead 99, the contact 48, a lead 105 to the rectifier 93 and thus the solenoid 94 is energized to cause the printing operation. The cams 45 and 47 are constructed with relation to each other to cause the pawl 70 to be firmly forced against the limit dog 86 and thus move the type characters 17 and 23 to the correct printing position, before the solenoid 94 is energized.

Fig. XII illustrates the position of the parts immediately after the printing operation. The cam 45 has rotated far enough to permit the contact 48 to open, de-energizing the solenoid 93. The cam 47 is still holding the link 57 up and the pawl and associated parts at the limit of their stroke, and the movable arm 49 of the double contact 50, 51 has ridden up on a surface 106 of the cam 46. In the normal operation of the mechanism, the fact that contact 50 is now open will make no difference since the current still passes through the contact 96, the lead 100, the contact 51, the lead 104 and the lead 102 to the motor.

Fig. XIII illustrates the mechanism in the position which will cause the motor to be substantially slowed down in its operation and to creep through the remainder of the revolution of the cams in order to prevent the momentum of the rotating parts from carrying the cams past the rest position which would, of course, start the complete cycle over again. The movable arm 49 of the contact 50, 51 has dropped off the surface 106 of the cam 46 and the contact 51 has now been opened. In this position, the current can no longer reach the motor by passing through the contact 96, the lead 100 and the contact 51 to leads 104 and 102 because the contact 51 is open. Neither can it pass through the contact 96, the lead 100, the contact 50 and the lead 99 because this latter circuit is all on one side of the line. Therefore, the contact 52 still being closed, the current will pass through the lead 98, the contact 52, a selenium rectifier 107, a resistance 108 and the lead 102 to the motor. However, the selenium rectifier being in the circuit, the alternating current waves are rectified into intermittent direct current and this intermittent current energizes the motor only enough to cause it to "inch" or rotate at a very low speed. Thus for the remainder of the cycle the motor moves relatively much slower than in the first five-sixths of the cycle and when the lower arm of the contact 50 drops off the surface 106 of the cam 46 and the circuit supplying the half wave rectified direct current to the motor is broken, the motor will immediately stop and there will be insufficient momentum to carry the parts beyond the rest position.

If the push button 95 is not released immediately after the arm 49 is engaged by the cam surface 103, as it should be, but is held in throughout the entire cycle, and the contact 97 is thus closed, at the position illustrated in Fig. XIII, the opening of the contact 51 will not cause the current to flow through the selenium rectifier circuit. If the button is held in, the current can pass through the lead 98, the lead 99, the contact 50, the lead 100, the contact 97, the lead 101 and the lead 102 to the motor. This would mean that if the motor were held in, the motor would not slow down slightly before the position shown in Fig. XIII but would continue at high speed and would start a second selecting and printing cycle. Therefore, the cam surface 106 is necessary to open the contact 50 as shown in Fig. XII. As has been explained, if the button is not held in at this time the opening of the contact 50 has no effect upon the operation. If, on the other hand, the push button is held in and the contact 97 is closed, breaking the contact 50 will cause the motor to be immediately slowed down. The current will not pass through the circuit just described with the contact 50 open. If the push button is held in, there is no connection through which the current can flow through contact 51 since it will only be connected to one side of the line at the point of contact of the lead 101 and the resistance 108. However, the current can, and will, pass through contact 52 and the selenium rectifier to the motor.

In Fig. XIII, the link 57 has been lowered and the pawl 70 and its associated parts removed from contact with the disk 10 and the ratchet sector 36. The ratchet sector 36, having been released by the pawl 70, has permitted the ratchet lever 34, the arm 19 and the arcuate strip 22 to return to their normal positions.

The embodiment of the invention that has been disclosed may be modified to meet various requirements.

Having described the invention, I claim:

1. In a printing weighing scale having a peripherally notched major-indicia-bearing disk movable in response to loads weighed on said scale, a minor-indicia-bearing member bearing indicia, a lever having a toothed end lying adjacent the edge of said disk and operatively connected to said minor-indicia-bearing member and fixed position means for imprinting the indicia borne by both of said members, a notch engaging pawl movable through a fixed path along the periphery of said disk and engageable in that one of the notches therein positioned in such path in response to a load on said scale and engageable in that one of the teeth in said lever adjacent which such notch in said disk is positioned by such load, a stop for limiting the movement of said pawl after engagement in such notch, linkage drivingly connected to said pawl for moving said pawl through such path, in combination, a preselecting member engageable with the periphery of said disk just prior in time to the engagement of said pawl in one of such notches for moving said disk if such notch is in position to be struck on the edge by said pawl and for holding said disk stationary until such engagement of said pawl, a two speed motor, a manually-operable starting switch for said motor, a cam driven by said motor for operating said linkage, switches for controlling the speed of said motor, a second cam driven by said motor for controlling said switches and another cam driven by said motor for controlling the operation of said printing means, whereby said motor rotates said cams to move said linkage and pawl to move said indicia bearing members until engagement of said pawl with said stop, and to cause imprinting of the indicia on said members and to operate said switches to slow the speed of said motor during the return of said pawl to starting position and then to stop said motor.

2. In a printing weighing scale having a peripherally notched major-indicia-bearing disk movable in response to loads weighed on said scale, a minor-indicia-bearing member, a lever having a toothed end lying adjacent the edge of said disk and operatively connected to said minor-indicia-bearing member and fixed position means for imprinting the indicia borne by both of said members, a notch engaging pawl movable through a fixed path along the periphery of said disk and engageable in that one of the notches therein positioned in such path in response to a load on said scale and engageable in that one of the teeth in said lever adjacent which such notch in said disk is positioned by such load, a stop for limiting the movement of said pawl after engagement in such notch and tooth, in combination, linkage drivingly connected to said pawl for moving said pawl through such path, a two speed motor, a manually-operable starting switch for said motor, a cam driven by said motor for operating said linkage, switches for controlling the speed of said motor, a second cam driven by said motor for controlling said switches and another cam driven by said motor for controlling the operation of said printing means, whereby said motor rotates said cams to move said linkage and pawl to move said indicia bearing members until engagement of said pawl with said stop, and to cause imprinting of the indicia on said members and to operate said switches to slow the speed of said motor during the return of said pawl to starting position and then to stop said motor.

LAWRENCE S. WILLIAMS.